US007431958B2

(12) United States Patent
Jayaprakasha

(10) Patent No.: US 7,431,958 B2
(45) Date of Patent: Oct. 7, 2008

(54) **USE OF FRACTION FROM *CINNAMOMUM ZEYLANICUM* FOR PRESERVING FOOD**

(75) Inventor: Guddadarangavvanahally Krishnareddy Jayaprakasha, Karnataka (IN)

(73) Assignee: Council of Scientific & Industrial Research, New Delhi (IN)

( * ) Notice: Subject to any disclaimer, the term of this patent is extended or adjusted under 35 U.S.C. 154(b) by 491 days.

(21) Appl. No.: 11/011,787

(22) Filed: Dec. 15, 2004

(65) Prior Publication Data
US 2005/0158436 A1 Jul. 21, 2005

(30) Foreign Application Priority Data
Dec. 22, 2003 (WO) .................. PCT/IB03/06100

(51) Int. Cl.
*A23L 3/3472* (2006.01)
(52) U.S. Cl. .............. 426/542; 426/431; 426/429; 426/541; 424/739
(58) Field of Classification Search .......... 426/429, 426/431, 489, 542; 424/739
See application file for complete search history.

(56) References Cited

OTHER PUBLICATIONS

Lee, Kwang-Chen and Takayuki Shibamoto. Determination of Antioxidant Potential of Volatile Extracts Ioslated from Various Herbs and Spices. 2002. J. Agric. Food Chem. vol. 50. 4947-4952.*

Jayaprakasha, G.K., L. Jaganmohan Rao and K.K. Sakariah. Chemical Composition of the Volatile Oil from the Fruits of *Cinnamomum zeylanicum* Blume. 1997. Flavour and Fragrance Journal. vol. 12. 331-333.*

Jayaprakasha, G.K., Ohnishi-Kameyana, M., Ono, H., Yoshida, M., Rao, L.J. "Phenolic Constituents in the Fruits of *Cinnamomum zeylanicum* and Their Antioxidant Activity." 2006. Journal of Agricultural and Food Chemistry. vol. 54. pp. 1672-1679.*

G.K. Jayaprakasha et al., Phenolic Constituents from the Lichen *Parmotrema stuppeum* (Nyl.) Hale and Their Antioxidant Activity, Notes, Verlag der Zeitschrift für Naturforschung. Tübingen—www.znaturforsch.com, 2000, pp. 1018-1022.

*The Wealth of India*, 1992, A Dictionary of Indian Raw Material and Industrial Products, III Publications and Information Directorate, New Delhi, pp. 582-588.

U. M. Senanayake et al., Volatile Constituents of Cinnamon (*Cinnamomum zeylanicum*) Oils, *J. Agric. Food Chem.*, American Chemical Society, 1978, 26, pp. 822-824.

D. L. Madhavi et al., Toxicological Aspects of Food Antioxidants, In-*Food Antioxidants*, Eds.; Madhavi et al., New York, 1995, pp. 267-293.

* cited by examiner

*Primary Examiner*—Carol Chaney
*Assistant Examiner*—Nikki H Dees
(74) *Attorney, Agent, or Firm*—Nixon Peabody, LLP

(57) ABSTRACT

The present invention relates to a use of brown color natural anti-oxidant fraction from fruit of the plant *Cinnamomun zeylanicum* for preserving the food articles, and a simple and efficient process for the preparation of a brown color natural antioxidant fraction from fruits of the plant *Cinnamomun zeylanicum*, wherein the solvents can be regenerated, and lastly, the fraction per se.

9 Claims, No Drawings

USE OF FRACTION FROM *CINNAMOMUM ZEYLANICUM* FOR PRESERVING FOOD

FIELD OF THE INVENTION

The present invention relates to a use of anti-oxidant fraction from fruit of the plant *Cinnamomum zeylanicum* for preserving the food articles.

BACKGROUND AND PRIOR ARTS

Antioxidants are the compounds which when added to food products, specially to lipids and lipid containing foods, can increase the shelf life by retarding the process of lipid peroxidation, which is one of the major reasons for deterioration of food products during the processing and storage. Synthetic antioxidants, such as butylated hydroxyanisole (BHA) and butylated hydroxytoluene (BHT), have restricted use in foods as these synthetic antioxidants are suspected to be carcinogenic (Madhavi, D. L.; Salunkhe, D. K. Toxicological Aspects of Food Antioxidants, In-*Food Antioxidants*, Eds.; Madhavi, D. L., Deshpande, S. S. Salunkhe, D. K., Marcel Dekker Inc. New York, 1995, p.267). Therefore, the importance of search and exploitation of natural antioxidants, especially of plant origin has greatly increased in recent years (Jayaprakasha, G. K. and Jaganmohan Rao, L. *Zeitschrift für Naturforschung* 2000, 55c, 1018-1022).

Lauraceae is an economically important family consisting mostly of trees or tree-like shrubs. The genus *Cinnamomum* comprises about 250 species which are distributed in Asia and Australia. The trees occur in South India up to altitudes of 500 meters, but mostly below 200 meters. The trees flower in January and fruits ripen during May-August (*The Wealth of India*, 1992. A Dictionary of Indian Raw materials and Industrial products, III Publications and Information Directorate, New Delhi, pp. 582). *Cinnamomum zeylanicum* (*C. zeylanicum*), the source of cinnamon bark, leaf and their essential oils, is an indigenous tree of Sri Lanka. Many species of cinnamon yield a volatile oil on distillation.

The most important cinnamon oils in world trade are those from *C. zeylanicum*, *C. cassia* and *C. camphora*. The other species provide oils, which are utilized as sources for chemical isolates. However, a number of other cinnamon species are distilled on a much smaller scale and the oils used either locally or exported. Cinnamon leaf and bark are used as spices and in the production of essential oils. Leaves have a hot taste and emit a spicy odor when crushed. Cinnamon offers a variety of oils with different aroma characteristics and composition to the flavor industry. The root bark was reported to have camphor as the main constituents, but does not seem to have commercial value, unlike leaf and stem bark oils [Senanayake, U. M.; Lee, T. H.; Wills, R. B. H. Volatile constituents of cinnamon (*Cinnamomum zeylanicum*) oils. *J. Agric. Food. Chem.* 1978, 26, 822-824]. Cinnamon leaf oil has a warm, spicy, but rather harsh odor, lacking the rich body of the bark oil. Leaf oil has fragrant odor and very pungent taste.

Literature survey revealed that, there is no report on the isolation of antioxidant fraction from *C. zeylanicum* unconventional parts viz., fruits.

OBJECTS OF THE PRESENT INVENTION

The main object of the present invention is to develop a use of anti-oxidant fraction from fruit of the plant *Cinnamomum zeylanicum* for preserving the food articles.

Another main object of the present invention is to develop an anti-oxidant of high activity.

Yet another object of the present invention is to develop an anti-oxidant fraction with no deleterious effect on consumer.

Another main object of the present invention is to develop a simple and efficient process for the preparation of an anti-oxidant fraction from fruits of the plant *Cinnamomum zeylanicum*, wherein the solvents can be regenerated.

Still another object of the present invention is to develop an anti-oxidant fraction from fruit of the plant *Cinnamomum zeylanicum*.

SUMMARY OF THE PRESENT INVENTION

The present invention relates to a use of brown color natural anti-oxidant fraction from fruit of the plant *Cinnamomum zeylanicum* for preserving the food articles, and a simple and efficient process for the preparation of an antioxidant fraction from fruits of the plant *Cinnamomum zeylanicum*, wherein the solvents can be regenerated, and lastly, the fraction per se

DETAILED DESCRIPTION OF THE PRESENT INVENTION

The present invention relates to a use of brown color natural anti-oxidant fraction from fruit of the plant *Cinnamomum zeylanicum* for preserving the food articles, and a simple and efficient process for the preparation of an antioxidant fraction from fruits of the plant *Cinnamomum zeylanicum*, wherein the solvents can be regenerated, and lastly, the fraction per se In still another embodiment of the present invention, wherein an anti-oxidant fraction from fruit of the plant *Cinnamomum zeylanicum* for preserving the food articles.

In still another embodiment of the present invention, wherein the anti-oxidant property is ranging between 70-95%.

In still another embodiment of the present invention, wherein the fraction shows no deleterious effect on consumption.

In still another embodiment of the present invention, wherein a simple and efficient process for the preparation of an antioxidant fraction from fruits of the plant *Cinnamomum zeylanicum*, wherein the solvents can be regenerated, said process comprises steps of:

powdering the fruits of the plant to a mesh size of 50-90, extracting the powder with hexane in a Soxhlet extractor at a temperature ranging between of 50-65° C. for a period ranging between 5-9 hours to obtain spent, extracting the spent with water at temperature ranging between 90-140° C. under pressure ranging between 0-25 psi for a period ranging between 5-35 min, filtering the extract to obtain the particle-free extract, concentrating the particle-free extract at temperature ranging between 30-45° C. under vacuum at 5-30 mm of mercury.

drying the concentrated extract at temperature ranging between 35-55° C. under vacuum of 5-30 mm of mercury, obtaining brown color fraction having antioxidant activity In still another embodiment of the present invention, wherein the yield of antioxidant fraction is ranging between 3.8 to 4.2%.

In still another embodiment of the present invention, wherein the anti-oxidant property is ranging between 70-95%.

In still another embodiment of the present invention, wherein an anti-oxidant fraction from fruit of the plant *Cinnamomum zeylanicum* as obtained by the process of claim 1.

In still another embodiment of the present invention, wherein the fraction have moisture content ranging between 5 to 8%.

In still another embodiment of the present invention, wherein the fraction is in powder form.

In still another embodiment of the present invention, wherein the fraction have moisture content of about 44.5+/−1.7.

The present invention provides a process for preparation of antioxidant fraction from cinnamon fruits. Hence, we have developed a process for the preparation of bioactive fraction from C. zeylanicum unconventional parts.

The principle of the present invention is to provide technology for the preparation of antioxidant fraction from C. zeylanicum unconventional parts, which can be used as potential natural antioxidant.

This invention is related to an efficient process for the preparation of antioxidant fraction from the C. zeylanicum unconventional parts.

Therefore, the object of the present invention is to provide a process for the preparation of antioxidant fraction from C. zeylanicum unconventional parts. The product obtained according to the present invention is brown in colour. The process is efficient and it involves the use of simple extraction methods and solvents, which can be regenerated.

Accordingly, the present invention provides the process for the preparation of antioxidant fraction, which comprises, i) powdering the fruits of the plant to a particle size of 200-250 microns.
ii) extracting the powder with hexane in a Soxhlet extractor at a temperature ranging between of 50-65° C. for a period ranging between 5-9 hours to obtain spent.
iii) extracting the spent with water at temperature ranging between 90-140° C. under pressure ranging between 0-25 psi for a period ranging between 5-35 min.
iv) filtering the extract to obtain the particle-free extract.
v) concentrating the particle-free extract at temperature ranging between 30-45° C. under vacuum at 5-30 mm of mercury.
vi) drying the concentrated extract at temperature ranging between 35-55° C. under vacuum of 5-30 mm of mercury,
vii) obtaining brown color fraction having antioxidant activity In an embodiment of the present invention, wherein the yield of antioxidant fraction is ranging between 3.8 to 4.2%.

In another embodiment of the present invention, wherein the anti-oxidant property in model systems (containing components from foods) is ranging between 70-95%.

In another embodiment of the present invention, an antioxidant fraction from fruit of the plant Cinnamomum zeylanicum as obtained by the aforementioned process, which contain 44.5±1.7% phenolics.

The preparation of antioxidant fraction from C. zeylanicum unconventional parts was done according to following flow diagram:

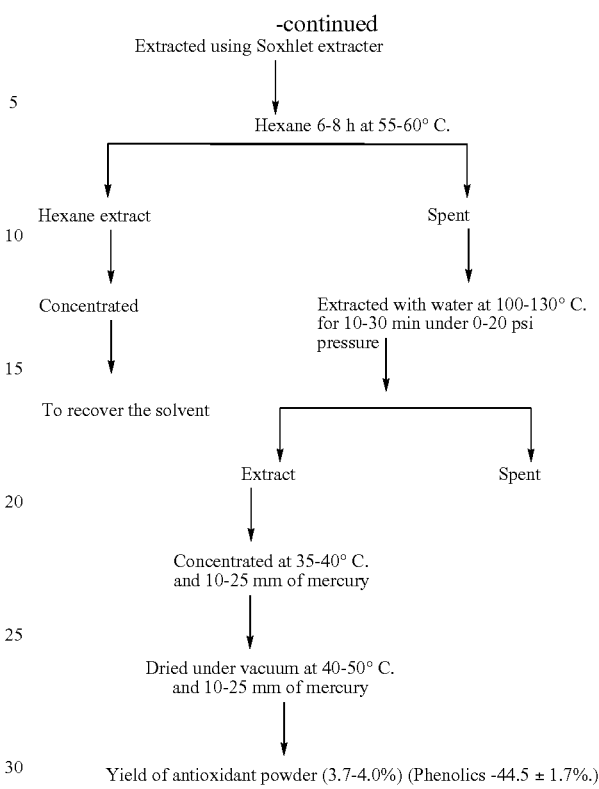

Product Specifications

Moisture:

Colour: Brown

Appearance/Shape: Powder

Phenolic content: 44.5±1.7%

The novelty of the process is:
1. Natural antioxidant from the unconventional parts of Cinnamomum zeylanicum viz., fruits using aqueous extraction.
2. Less unit operation to obtain antioxidant fraction.

The Advantages of the Process is
1. The process is simple and the solvents used in this process can be regenerated for further use.
2. The raw material has no commercial value at present.
3. This is the first report of preparation of antioxidant fraction from cinnamon unconventional parts.

The following examples are given by way of illustration of the present invention and therefore should not be constructed to limit the scope of the present invention.

EXAMPLES

Example 1

50 g of fruits of Cinnamomum zeylanicum were powdered using mixer grinder to get a mesh size of 60-80. The powder was extracted using 200 ml of hexane at 60° C. for 6 h in a Soxhlet extractor. The hexane extract was concentrated to recover the solvent. The spent was further extracted with 250 ml water at 120° C. under 15 psi pressure for 20 min. The water extract was filtered using Whatman filter paper No.1. The extract was concentrated at a temperature of 40° C. and under reduced pressure at 25 mm of mercury and dried in vacuum oven at 40° C. and 10 mm of mercury to get 1.85 g of brown powder.

Example 2

Fruits (100 g) of *Cinnamomum zeylanicum* were powdered and to get a mesh size of 80 and it was extracted with 400 ml of hexane by using Soxhlet extractor at 55° C. for 8 h. The extract was collected and concentrated to recover the solvent. The spent obtained after hexane extraction was further extracted with 600 ml water at 130° C. under 20 psi pressure for 10 min. The extract was filtered through Whatman filter paper no. 1. The filtrate was concentrated at a temperature of 35° C. and under a reduced pressure at 25 mm of mercury and dried in vacuum oven at a temperature of 50° C. and under vacuum of 25 mm of mercury. The yield of brown powder was 4.03 g.

The water extract obtained in the above methods was screened for antioxidant activity using 1,1-diphenyl-2-picryl-hydrazyl (DPPH) [J. Agricultural and Food Chemistry, 50, 81-86, 2002]. It showed 76 and 94% antioxidant activity at 25 and 50 ppm respectively using DPPH method, while BHA showed 71 and 94% and 25 and 50 ppm respectively

Example 3

Fruits (150 g) of *Cinnamomum zeylanicum* were powdered to get 80 mesh size and it was extracted with 600 ml of hexane by using Soxhlet extractor at 60° C. for 6 h. The extract was collected and concentrated to recover the solvent. The spent obtained after hexane extraction was further extracted with 750 ml water at 100° C. for 30 h. The extract was filtered through Whatman filter paper no. 1. The filtrate was concentrated at a temperature of 40° C. and under reduced pressure at 10 mm of mercury and dried in a vacuum oven at 40° C. under vacuum at 25 mm of mercury to get 5.9 g of brown powder.

The water extract obtained, was screened for antioxidant activity using β-carotene-linoleate model systems. The water extract showed 78 and 83% antioxidant activity at 100 and 200 ppm respectively, using β-carotene-linoleate method, while BHA showed 81 and 89% antioxidant activity at 100 and 200 ppm.

The linolenic acid present in some of the edible oils, hence the same study can be extended to food systems for enhancing the shelf life of oils and oil containing food systems.

The invention claimed is:

1. An additive for preserving food articles consisting of an anti-oxidant, aqueous fraction from fruit of the plant *Cinnamomum zeylanicum*.

2. The additive of claim 1, wherein the anti-oxidant property ranges between 76%-94% using 1,1-diphenyl-2-picrylhydrazyl screening.

3. A simple and efficient process for the preparation of a brown color natural antioxidant, aqueous fraction from the fruits of the plant *Cinnamomum zeylanicum*, wherein the solvents can be regenerated, said process comprises the steps of:
   i) powdering the fruits of the plant to a mesh size of 50-90,
   ii) extracting the powder with hexane in a Soxhlet extractor at a temperature ranging between of 50-65° C. for a period ranging between 5-9 hours to obtain spent,
   iii) extracting the spent with water at temperature ranging between 90-140° C. under pressure ranging between 0 -25 psi for a period ranging between 5-35 mm,
   iv) filtering the extract to obtain the particle-free extract,
   v) concentrating the particle-free extract at a temperature ranging between 35-55° C. under vacuum of 5-30 mm of mercury,
   vii) a brown colored fraction having antioxidant activity.

4. The process as claimed in claim 3, wherein the yield of antioxidant fraction is ranging between 3.8 to 4.2%.

5. The process as claimed in claim 3, wherein the antioxidant property ranges between 76%-94% using 1,1-diphenyl-2-picrylhydrazyl screening.

6. A brown color natural anti-oxidant fraction from spent of the fruit of the plant *Cinnamomum zeylanicum* as obtained by the process of claim 3.

7. A fraction as claimed in claim 6, wherein the fraction has a moisture content ranging between 5 to 8%.

8. A fraction as claimed in claim 6, wherein the fraction is in powder form.

9. A fraction as claimed in claim 6, wherein the fraction contains about 44.5+/−1.7% phenolics.

* * * * *